March 14, 1967   N. A. KELLY   3,308,997
PLASTIC JUG
Filed Oct. 11, 1965   2 Sheets-Sheet 1
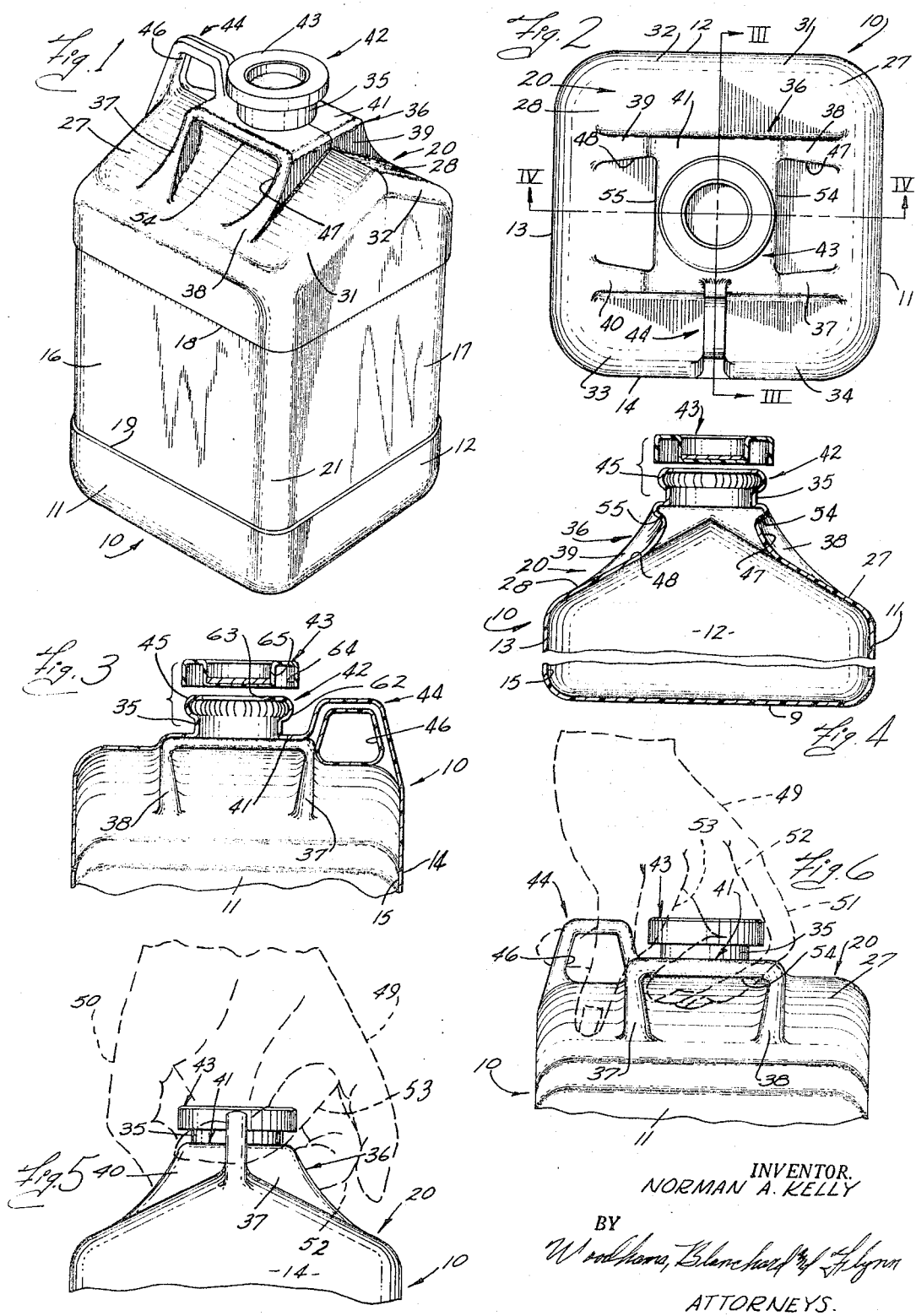
INVENTOR.
NORMAN A. KELLY
BY
Woodhams, Blanchard & Flynn
ATTORNEYS.

March 14, 1967 N. A. KELLY 3,308,997
PLASTIC JUG
Filed Oct. 11, 1965 2 Sheets-Sheet 2
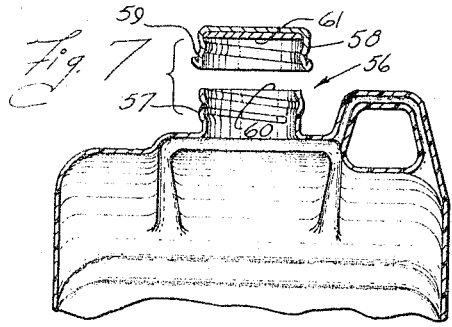
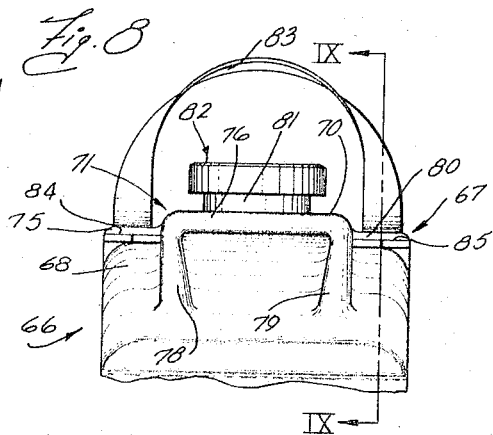
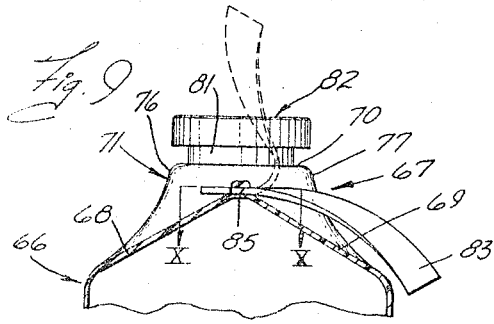
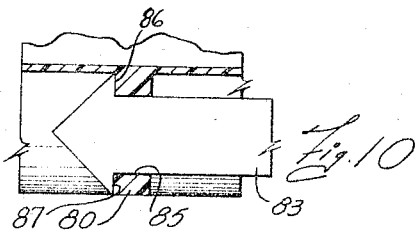
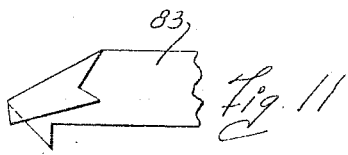
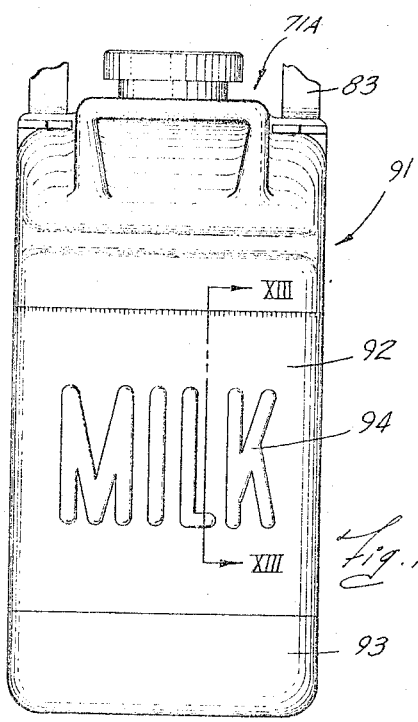
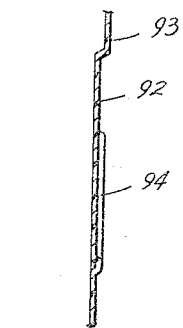
INVENTOR.
NORMAN A. KELLY
BY
ATTORNEYS United States Patent Office 3,308,997
Patented Mar. 14, 1967

3,308,997
PLASTIC JUG
Norman A. Kelly, Wayne Township, Kosciusko County, Ind., assignor to Crystal Preforming and Packaging, Inc., Warsaw, Ind., a corporation of Indiana
Filed Oct. 11, 1965, Ser. No. 494,522
9 Claims. (Cl. 222—475)

This invention relates in general to plastic containers and, more particularly, to a thin-walled, blow-molded plastic jug having a capacity in the range of from one quart to one gallon.

Numerous attempts have been made to develop plastic containers, such as liquid-carrying jugs, which would serve various purposes. In recent years, for example, plastic jugs have been developed for use in distributing milk to consumers. However, makers and users of such jugs have continued to follow the operational procedures which have become characterized by their development with containers which are fabricated from far less rugged materials, such as glass and paperboard. It has been found, however, that the procedure utilized for filling and otherwise handling plastic containers need not be as delicate as those required for handling glass containers, for example. It has also been found that plastic containers can, if properly constructed, be handled by automatic machinery practically from the time they are formed until they reach the consumer. That is, the plastic containers can be formed on an automatic blow-molding machine, filled on an automatic filling machine, crated by mechanical means and thereafter distributed with very little or no manual handling required.

Accordingly, it was with this thought in mind that the plastic container, which is the subject of this invention, was developed. The plastic container of the invention is specifically constructed so that it can be engaged by mechanical apparatus after it is filled and thus crated without any manual engagement thereof.

At the same time, it became apparent that the structure designed on the container for mechanical engagement of the container might also be capable of serving as a handle construction. It is believed that the embodiments disclosed in this application are capable of achieving both of these purposes, namely, engagement by hand and by mechanical loading apparatus.

It was also recognized that any handle means associated with the container should not interfere with an orderly stacking of the containers and, if possible, should be arranged so that it cooperates with the principal handle means in performing its function when manually engaged.

Accordingly, a primary object of this invention has been the provision of a thin-walled plastic container which can be produced by blow-molding procedures, which has gripping means connected to the upper structure thereof and arranged for manual engagement to serve as handle means and also for engagement by mechanical equipment provided for loading the filled containers in crates, cartons or the like.

A further object of this invention has been the provision of a container, as aforesaid, which is pleasing in appearance, completely satisfactory in operation, and designed for construction by a simple method capable of achieving the desired performance.

A further object of this invention has been the provision of a container, as aforesaid, which is strong and durable in construction, which is arranged to provide maximum capacity with minimum space occupied in view of the type of materials which it contains and which is designed so that indicia can be placed on the side wall thereof without being subjected to easy defacement.

A further object of this invention has been the provision of a container, as aforesaid, which will meet the rigid requirements for use as a container of edible materials, such as milk, which is adapted to filling by machines presently in operation, which is suitable for holding a wide variety of materials without affecting adversely either the material or the container, and which is susceptible to stacking or crating when filled without damaging the container or its contents.

Other objects and purposes of this invention will become apparent to persons familiar with this type of product upon reading the following descriptive materials and examining the accompanying drawings, in which:

FIGURE 1 is a perspective view of a plastic container embodying the invention.

FIGURE 2 is a top plan view of a plastic container embodying the invention.

FIGURE 3 is a fragment of a sectional view taken on the line III—III of FIGURE 2.

FIGURE 4 is a broken sectional view taken on the line IV—IV of FIGURE 2.

FIGURE 5 is the rear end view of the top portion of the plastic container showing one positioning of the hand for the pouring operation.

FIGURE 6 is a side view of the top portion of the plastic container showing the positioning of the hand for the pouring operation.

FIGURE 7 is a sectional view similar to FIGURE 3 and showing a modified spout structure.

FIGURE 8 is a side view of the upper portion of a modified plastic container.

FIGURE 9 is a sectional view taken on the line IX—IX of FIGURE 8.

FIGURE 10 is a sectional view taken on the line X—X of FIGURE 9.

FIGURE 11 is a fragment of FIGURE 10 showing the plastic handle in a folded condition.

FIGURE 12 is a side elevational view of another modified plastic container.

FIGURE 13 is a sectional view taken on the line XIII—XIII of FIGURE 12.

For convenience in description, the terms "upper," "lower" and words of similar import will have reference to the container of the invention as appearing in FIGURES 1 and 12. The terms "inner," "outer" and derivatives thereof will have reference to the geometric center of said container and parts thereof.

*General construction*

The objects and purposes of the invention, including those set forth above, have been met by providing a thin-walled plastic container which is preferably, but not necessarily, fabricated by blow-molding procedures. The container is substantially rectangular and has a gabled top structure including a pair of roof panels which converge upwardly toward a ridge. A spout-supporting neck structure is integral with and extends upwardly from the central portion of the top structure, and said neck structure includes a pair of flanges projecting in opposite directions away from said ridge for comfortable manual engagement by and between the thumb and forefingers of an average adult hand. The pouring spout projects upwardly from the upper surface of the neck structure and, accordingly, communicates with the interior of the container. A handle is mounted upon the top structure for supporting the container under some circumstances.

*Detailed description*

The thin-walled plastic container 10 (FIGURE 1) which is a gallon jug in this instance, is comprised of four side walls 11, 12, 13 and 14, and a bottom wall 9

(FIGURES 1 and 4), which define a substantially rectangular materials compartment 15. The four side walls and the bottom wall are blended together by curved corner portions, such as the curved portion 21 between the side walls 11 and 12. These curved wall portions all tend to strengthen the side walls and bottom wall of the plastic container so that they will resist bulging when they contain a quantity of material and they will not readily collapse when they are stacked, or when the container walls are compressed by manual gripping.

Further strengthening of the large containers, particularly is effected by the recessed portions in the side walls of the container 10. Two such recessed wall portions 16 and 17 are shown in FIGURE 1. The inter section of the recessed portions with the remainder of the side walls forms the ridges 18 and 19 which encompass the container 10 and give strength to the side walls. The recess portions 16 and 17 also provide a protected surface upon which indicia, such as the contents of the container, can be placed.

Upwardly and inwardly sloping roof panels 27 and 28 (FIGURE 2) are integrally connected to side walls 11 and 13, respectively. The side walls 12 and 14 are blended with the sloping roof panels 27 and 28 by curved wall portions 31, 32, 33 and 34.

Mounted on the top of the gabled roof structure 20 is a neck structure 36, which is comprised of a horizontal platform 41 from which the spout 42 projects upwardly. The neck structure 36 is braced by four ribs 37, 38, 39 and 40, which are integrally connected to the platform 41 and to the sloping roof panels 27 and 28. The underside of the horizonal platform 41 and the inner surfaces of ribs 37 and 38 define a recess 47 (FIGURE 4), and the underside of the horizontal platform 41 and the inner surfaces of ribs 39 and 40 define a recess 48. Thus, the plastic container can be raised by inserting the thumb and fingers of the same hand into the recesses 47 and 48 and thereafter raising the hand.

The spout 42 (FIGURE 4) is designed so that it is concentric about the vertical centerline of the container 10. The spout 42 consists of a vertical cylindrical shell 35, integrally connected to the horizontal platform 41, and an upper rim structure 45 having an outside diameter somewhat larger than that of the outside diameter of the cylindrical shell 35. The pouring spout 42 is designed so that a "snap-on" cover 43 can be placed thereon to seal the contents within the container 10. Specifically, the rim structure 45 (FIGURE 3) has sealing points 62 and 63, and the cover 43 has corresponding sealing points 64 and 65, respectively, on the inner wall thereof.

A handle structure 44 (FIGURE 2) is integrally connected to and between the neck structure 36 and the side wall 14, adjacent the curved surfaces 31 and 32. The handle structure 44 is designed so that it has an opening 46 for at least one finger.

*Operation*

FIGURES 5 and 6 show an end view and a side elevational view, respectively, of a plastic container 10 with a hand 49 engaging said container in position for a pouring operation. Although the hand 49 in FIGURES 5 and 6 is the right hand, the left hand can be used alternatively. When it becomes desirable to remove the contents of the container 10, the right hand (or left hand) is placed so that the thumb 50 is placed into the recess 48, and the index finger 51, the second finger and/or third finger are placed in the recess 47. In order to prevent the container 15 from slipping out of the hand 49, it is essential that the forefingers and thumb should curve under the lips 54 and 55 of the platform 41 within the recesses 47 and 48, respectively. The third finger 53 (or the little finger) may be inserted through the opening 46 of the handle structure 44. In order to start the pouring operation, the third finger 53 (or the little finger) is moved toward the palm of the hand 49 thereby creating a pivotal movement of the container 10 about the line of contact through the thumb 50 and the fingers 51 and 52 with the lips 54 and 55.

The modified container structure 10A (FIGURE 7) differs from the container 10 in the spout 56. That is, the spout 56 is designed so that it has threads 57 protruding from the outer surface thereof for engagement by the threads of a screw-type cap 58. When the cap 58 is secured to the container 10A, a seal is formed between the top surface 60 of the spout 56 and the undersurface 61 of the cap 58.

Another modified container 66 (FIGURES 8 and 9) is of a smaller variety, namely, the half-gallon size. The lower portion of the container 66 (not shown) may be similar to that of container 10 shown in FIGURE 1. That is, container 66 has four side walls and a bottom wall defining a substantially rectangular compartment.

Container 66 has a gabled roof structure 67 similar to the gabled roof structure 20 shown in FIGURE 1. Integrally mounted on top of the sloping roof panels 68 and 69 of the gabled roof structure 67 are flange structures 76 and 77 respectively (FIGURE 9). These flange structures are similar to the flange structures defining the recesses 47 and 48 shown in FIGURE 2. That is, for example, the horizontal platform 70 is supported on and integrally connected to the sloping roof panel 68 (FIGURE 8) by the ribs 78 and 79 of said flange structure. Flange structure 77 (FIGURE 9) may be identical with flange structure 76. Mounted on top of the horizontal platform 70 is a spout 81 capable of receiving a "snap-on" cap 82 similar to the spout and "snap-on" cap shown in FIGURES 3 and 4.

A pair of upwardly projecting flanges 75 and 80 are provided on the opposite sides of the neck structure 71, as shown in FIGURE 8. The flanges 75 and 80 have openings 84 and 85, respectively, which are designed to receive therethrough a flexible carrying strap 83, which is preferably plastic. The end portions of the plastic strap 83 each have an arrowhead shape such that when the arrowhead is inserted through the openings 84 and 85, the outermost portions of the back edges 86 and 87 (FIGURE 10) bear against the sides of the flanges 75 and 80, thereby preventing the plastic strap 83 from being pulled back through the openings 84 and 85. In order to insert the arrowheads through the openings 84 and 85, it is necessary to fold the arrowheads as shown in FIGURE 11. When the arrowheads of the strap 83 are completely through the openings 84 and 85, the resiliency of the plastic material will cause the arrowheads to return to the position shown in FIGURE 10.

A modification of the plastic container 66 is shown at 91 in FIGURE 12. The upper portion of container 91, which may be of the half-gallon or quart size, is the same as the upper portion of container 66 (FIGURES 8 and 9) and will not therefore be described. The lower portion of the container 91 is similar to the lower portions of the containers hereinabove described. However, container 91 has a recessed portion 92 in its side wall 93 in which the letters M-I-L-K are formed when the container is molded. The thickness of the embossed letters 94 is preferably less than the depth of the recess. The purpose for this arrangement is to permit coating of these letters with coloring so that the color cannot rub off on adjacent containers, as would happen if the embossed letters were not recessed.

While particular preferred embodiments of the invention have been disclosed in detail hereinabove for illustrative purposes, it will be understood that variations or modifications of said disclosure, which lie within the scope of the appended claims, are full contemplated.

The embodiments of the invention in which an exclusive property or privilege is claimed are defined as follows:

1. A thin-walled, plastic container, comprising:
    four side walls and a bottom wall arranged to define a substantially rectangular materials compartment;
    integral top wall means including a pair of sloping panels converging upwardly toward a ridge substantially parallel with said bottom wall and disposed within a plane approximately midway between and parallel with two of said side walls;

flange means integral with said panels on opposite sides of said ridge, said flange means being substantially perpendicular to said plane; and spout means integral with and extending upwardly from said top wall between said flange means, said flange means and spout being arranged so that said flange means can be comfortably engaged by and between the thumb and forefingers of an average adult hand for raising and supporting said container when it is filled with materials.

2. In a thin-wall, plastic container having side walls and a bottom wall, a top structure, comprising:

a pair of sloped top panels converging upwardly toward a ridge substantially parallel with said bottom wall;

neck means integral with and projecting upwardly from said top panels, said neck means having flange means extending in opposite directions away from said ridge, the remote edges of said flange means being substantially parallel with said ridge and being substantially shorter than said ridge in a direction parallel therewith;

spout means integral with and projecting upwardly from said neck means between said flange means, said flange means and spout means being arranged so that said remote edges can be respectively engaged, one by the thumb and the other by at least one finger of an average adult hand for the purpose of supporting said container comfortably in a suspended position when it is filled with said materials.

3. A top structure according to claim 2, wherein said flange means have portions defining a substantially flat surface parallel with said bottom wall and encircling said spout means, said surface being spaced slightly upwardly from said ridge.

4. A top structure according to claim 2, including a U-shaped handle integral with and extending upwardly from said ridge on one side of said neck means, said handle being engageable by the third finger of a hand when the thumb and first two fingers of said hand are engaging said flanges, whereby said container can be tilted around an axis transverse of said ridge by moving said third finger upwardly with respect to said thumb and forefingers.

5. A top structure according to claim 2, including a pair of upwardly projecting elements integral with said ridge on opposite sides of said neck means, each element having slot means therethrough transverse of said ridge; and elongated flexible handle means having end portions inserted through said slot means, said end portions having stop means for preventing disengagement of said end portions from said elements when said container is supported by said handle means.

6. A structure according to claim 2, wherein at least one of said side walls has an inwardly offset portion spaced from the upper and lower edges thereof.

7. A thin-walled, plastic container, comprising:

four side walls and a bottom wall arranged to define a substantially rectangualr materials compartment;

integral top wall means including a pair of sloping panels converging upwardly toward ridge means substantially parallel with said bottom wall and disposed within a plane approximately midway between and parallel with two of said side walls;

neck means integral with and extending upwardly from said top wall means intermediate the opposite ends of said ridge means;

a pair of ears disposed in said plane and integral with said top wall means, said ears projecting upwardly from said ridge means on opposite sides of said neck means and having openings therethrough transversely of said plane; and elongated handle means having a pair of end portions receivable through said openings, said end portions having stop means for preventing disengagement of said end portions from said ears.

8. A container according to claim 7, wherein said neck means has a pair of downwardly facing flange means disposed upon opposite sides of said plane, said flange means being merged at their inner edges with said sloping panels;

platform means located upwardly of said flange means and having edge portions merging with the outer edges of said flange means, said platform means being substantially parallel with said bottom wall; and spout means projecting upwardly from said platform means.

9. A container according to claim 7, wherein said neck means includes rib means on opposite sides of said plane extending along said panels substantially between said upper wall means and said two side walls; and cap-engaging means connected to said neck means.

References Cited by the Examiner
UNITED STATES PATENTS 2,705,580   4/1955   Mack     222—475
3,250,434   5/1966   Howlett     222—465 X ROBERT B. REEVES, *Primary Examiner.*

HADD S. LANE, *Assistant Examiner.*